United States Patent
Matsumura et al.

(10) Patent No.: US 11,147,023 B2
(45) Date of Patent: Oct. 12, 2021

(54) USER TERMINAL

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/045,347

(22) PCT Filed: Apr. 6, 2018

(86) PCT No.: PCT/JP2018/014827
§ 371 (c)(1),
(2) Date: Oct. 5, 2020

(87) PCT Pub. No.: WO2019/193769
PCT Pub. Date: Oct. 10, 2019

(65) Prior Publication Data
US 2021/0029647 A1    Jan. 28, 2021

(51) Int. Cl.
*H04W 52/16* (2009.01)
*H04W 52/18* (2009.01)

(52) U.S. Cl.
CPC .................................. *H04W 52/18* (2013.01)

(58) Field of Classification Search
CPC ....................................................... H04W 52/18
USPC .................................................. 455/522, 69
See application file for complete search history.

(56) References Cited

U.S. PATENT DOCUMENTS

| | | | | |
|---|---|---|---|---|
| 8,537,862 B2* | 9/2013 | Blankenship | ......... | H04L 1/0004 370/483 |
| 8,792,445 B2* | 7/2014 | Ng | ......... | H04L 5/0091 370/329 |
| 8,934,430 B2* | 1/2015 | Zhang | ......... | H04L 5/0051 370/329 |
| 9,019,924 B2* | 4/2015 | Ng | ......... | H04B 7/0452 370/329 |
| 9,277,513 B2* | 3/2016 | Kim | ......... | H04W 52/42 |

(Continued)

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).

(Continued)

*Primary Examiner* — Hai V Nguyen
(74) *Attorney, Agent, or Firm* — Osha Bergman Watanabe & Burton LLP

(57) ABSTRACT

A user terminal according to an aspect of the present disclosure includes a transmitting/receiving section that performs at least one of transmission and reception of a demodulation reference signal (DMRS) for a physical shared channel, and a control section that determines a power for the DMRS without taking account of a resource element to which the DMRS is not allocated, with reference to a table providing a definition of a ratio of a power (EPRE) for each resource element of the physical shared channel to an EPRE for the DMRS to which a certain number of CDM groups is applied. According to one aspect of the present disclosure, it is possible to use the same transmission power for data symbols and DMRS symbols even in NR.

4 Claims, 10 Drawing Sheets

(56) References Cited

U.S. PATENT DOCUMENTS

| | | | |
|---|---|---|---|
| 9,918,323 B2* | 3/2018 | Seo | H04W 72/08 |
| 9,923,684 B2* | 3/2018 | Ng | H04L 5/0053 |
| 9,954,660 B2* | 4/2018 | Zhang | H04L 5/0094 |
| 10,530,545 B2* | 1/2020 | Zhang | H04W 52/22 |
| 10,863,494 B2* | 12/2020 | Zhang | H04L 5/005 |
| 10,986,622 B2* | 4/2021 | Zhang | H04L 5/0044 |
| 2010/0254471 A1* | 10/2010 | Ko | H04L 5/0023 375/260 |
| 2011/0141987 A1* | 6/2011 | Nam | H04L 5/0053 370/329 |
| 2012/0207119 A1* | 8/2012 | Zhang | H04L 5/0051 370/329 |
| 2012/0213186 A1* | 8/2012 | Ng | H04L 5/0007 370/329 |
| 2013/0265951 A1* | 10/2013 | Ng | H04W 72/042 370/329 |
| 2013/0301434 A1* | 11/2013 | Krishnamurthy | H04B 7/0617 370/252 |
| 2014/0192734 A1* | 7/2014 | Ng | H04L 5/0035 370/329 |
| 2015/0092722 A1* | 4/2015 | Zhang | H04L 5/0048 370/329 |
| 2016/0094326 A1* | 3/2016 | Moon | H04L 5/0091 370/330 |
| 2018/0227098 A1* | 8/2018 | Zhang | H04L 5/0091 |
| 2019/0174449 A1* | 6/2019 | Shan | H04W 60/00 |
| 2019/0174466 A1* | 6/2019 | Zhang | H04L 5/0048 |
| 2019/0281587 A1* | 9/2019 | Zhang | H04L 5/0053 |
| 2020/0022089 A1* | 1/2020 | Guo | H04W 52/146 |
| 2020/0127786 A1* | 4/2020 | Kwak | H04L 5/0026 |
| 2020/0280981 A1* | 9/2020 | Shin | H04L 5/0092 |
| 2021/0067391 A1* | 3/2021 | Sengupta | H04J 13/004 |
| 2021/0105753 A1* | 4/2021 | Zhang | H04L 5/0048 |

OTHER PUBLICATIONS

International Search Report issued in International Application No. PCT/JP2018/014827, dated Jun. 12, 2018 (3 pages).

Written Opinion issued in International Application No. PCT/JP2018/014827; dated Jun. 12, 2018 (3 pages).

* cited by examiner

RATIO OF PDSCH EPRE TO DM-RS EPRE

| Number of DM-RS CDM groups without data | DM-RS CONFIGURATION TYPE 1 | DM-RS CONFIGURATION TYPE 2 |
|---|---|---|
| 1 | 0 dB | 0 dB |
| 2 | -3 dB | -3 dB |
| 3 | - | -4.77 dB |

FIG. 1

RATIO OF PUSCH EPRE TO DM-RS EPRE

| Number of DM-RS CDM groups without data | DM-RS CONFIGURATION TYPE 1 | DM-RS CONFIGURATION TYPE 2 |
|---|---|---|
| 1 | 0 dB | 0 dB |
| 2 | -3 dB | -3 dB |
| 3 | - | -4.77 dB |

FIG. 2

| Number of DM-RS CDM groups without data | DM-RS CONFIGURATION TYPE 1 | DM-RS CONFIGURATION TYPE 2 |
|---|---|---|
| 1 | -3 dB | -4.77 dB |
| 2 | 0 dB | -1.76 dB |
| 3 | - | 0 dB |

RATIO OF PDSCH EPRE TO DM-RS EPRE

FIG. 3

| Number of DM-RS CDM groups without data | RATIO OF PUSCH EPRE TO DM-RS EPRE | |
|---|---|---|
| | DM-RS CONFIGURATION TYPE 1 | DM-RS CONFIGURATION TYPE 2 |
| 1 | -3 dB | -4.77 dB |
| 2 | 0 dB | -1.76 dB |
| 3 | - | 0 dB |

FIG. 4

USER TERMINAL

TECHNICAL FIELD

The present disclosure relates to a user terminal in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency, and so on (see Non-Patent Literature 1). For the purpose of further high capacity, advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (referred to as, for example, "FRA (Future Radio Access)," "5G (5th generation mobile communication system)," "5G+(plus)," "NR (New Radio)," "NX (New radio access)," "FX (Future generation radio access)," "LTE Rel. 14," "LTE Rel. 15" (or later versions), and so on) are also under study.

For transmission of an uplink shared channel (PUSCH (Physical Uplink Shared Channel)) in existing LTE systems (for example, LTE Rel. 8 to Rel. 13), a decoding reference signal (DMRS) for the channel is transmitted in all the resource elements in the same transmission bandwidth as that of the PUSCH.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, NR), a DMRS mapped to a downlink shared channel (PDSCH (Physical Downlink Shared Channel)) and a PUSCH is sometimes in a comb-like (comb-tooth-like) configuration in a frequency direction. One side of this comb is for the DMRS, and the other side is set to null. In a null resource, nothing may be transmitted, or data may be transmitted.

However, in NR, the same transmission power may not be used for symbols of data and DMRS symbols of the data according to currently studied specifications about DMRS power, and this may cause negative effects such as interference and reduction in throughput.

In view of the above, an object of the present disclosure is to provide a user terminal capable of using the same transmission power for data symbols and DMRS symbols even in NR.

Solution to Problem

A user terminal according to one aspect of the present disclosure includes a transmitting/receiving section that performs at least one of transmission and reception of a demodulation reference signal (DMRS) for a physical shared channel, and a control section that determines a power for the DMRS without taking account of a resource element to which the DMRS is not allocated, with reference to a table providing a definition of a ratio of a power (EPRE) for each resource element of the physical shared channel to an EPRE for the DMRS to which a certain number of CDM groups is applied.

Advantageous Effects of Invention

According to an aspect of the present disclosure, it is possible to use the same transmission power for data symbols and DMRS symbols even in NR.

BRIEF DESCRIPTION OF DRAWINGS

FIG. 1 is a diagram to show an existing definition of a ratio of PDSCH EPRE to DMRS EPRE ($1/\beta_{DMRS}$ [dB]);

FIG. 2 is a diagram to show an existing definition of the ratio of PUSCH EPRE to DMRS EPRE ($1/\beta_{DMRS}$ [dB]);

FIG. 3 is a diagram to show an example of the ratio of PDSCH EPRE to DMRS EPRE ($1/\beta_{DMRS}$ [dB]);

FIG. 4 is a diagram to show an example of the ratio of PUSCH EPRE to DMRS EPRE ($1/\beta_{DMRS}$ [dB]);

DESCRIPTION OF EMBODIMENTS

Figure 5:
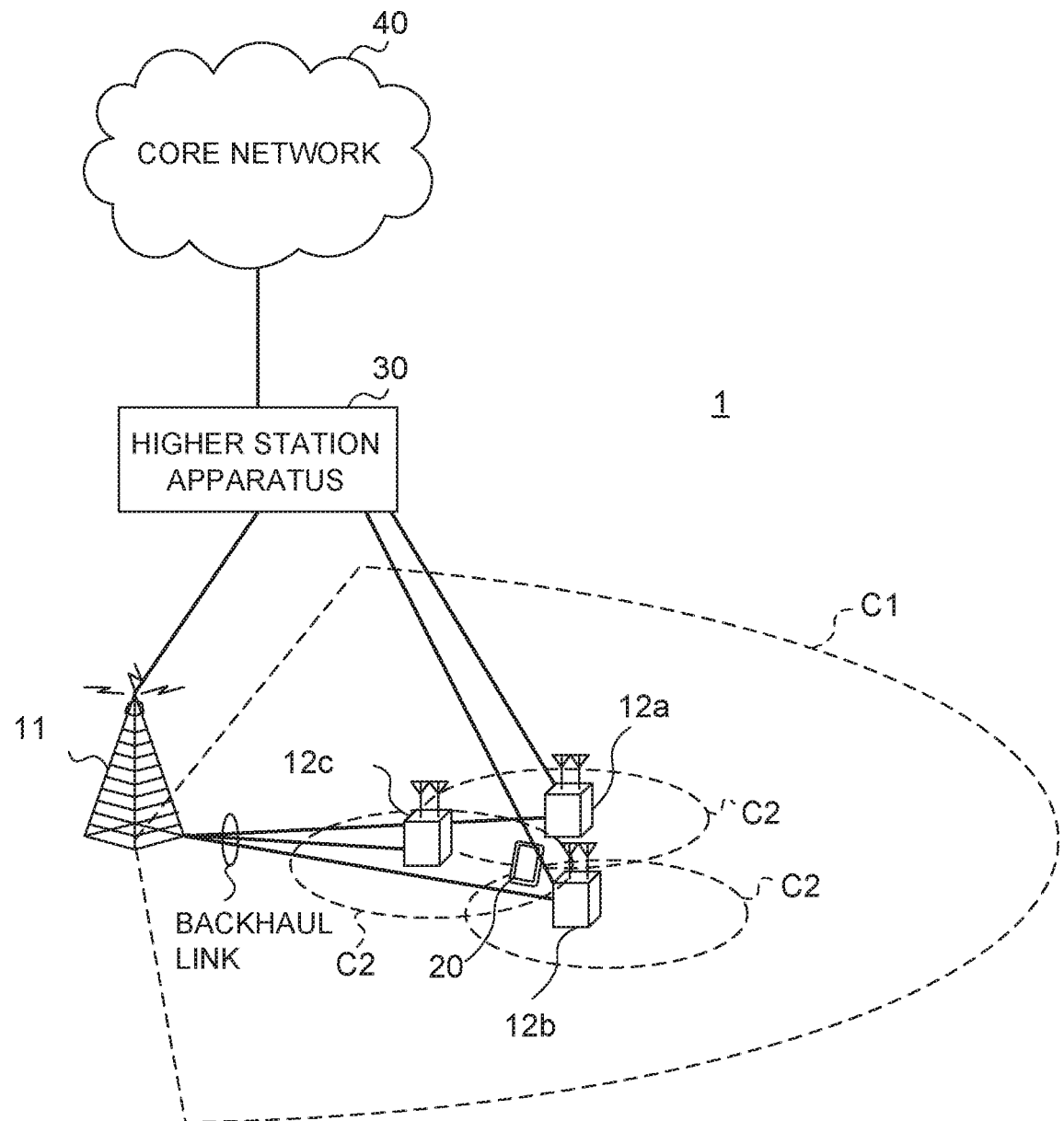
FIG. 5 is a diagram to show an example of a schematic structure of a radio communication system according to one embodiment.

A resource (RE) mapping pattern for a DMRS to be used for a shared channel (a PUSCH or a PDSCH) in NR is determined depending on DMRS configuration type. A DMRS configuration type for each channel may be configured for a UE by a base station by using higher layer signaling.

Here, for example, the higher layer signaling may be any one or combinations of RRC (Radio Resource Control) signaling, MAC (Medium Access Control) signaling, broadcast information, and the like.

For example, the MAC signaling may use MAC control elements (MAC CE), MAC PDUs (Protocol Data Units), and the like. For example, the broadcast information may be master information blocks (MIBs), system information blocks (SIBs), minimum system information (RMSI (Remaining Minimum System Information)), other system information (OSI), and the like.

The UE may determine a DL (UL) DMRS as type 2 in a case that an RRC information element (a "dmrs-Type" information element) is configured for DL (UL), and as type 1 in a case that no such RRC information element is configured, for example.

In DMRS configuration type 1, a DMRS to be mapped has a comb-like (comb-tooth-like) configuration in a frequency direction. One side of this comb is for the DMRS, and the other side is set to null. In a null resource, nothing may be transmitted, or data may be transmitted. In other words, in DMRS configuration type 1, six REs may be used for a DMRS per PRB and per port.

In DMRS configuration type 2, four REs may be mapped per PRB and per port, for example.

In consideration of interference and the like, the same transmission power is preferably used for data symbols and DMRS symbols. Data symbols here may indicate symbols in a period where no DMRS symbol is mapped. If different transmission powers are used for data symbols and DMRS symbols, fluctuations may occur in a transmitted signal waveform at the time when transmission powers are switched, and this may deteriorate communication properties. Also to avoid such deterioration in communication properties, the same transmission power is preferably used for the data symbols and the DMRS symbols.

FIG. 1 and FIG. 2 show DMRS EPRE (Energy Per Resource Element) studied for NR previously. An EPRE corresponds to a power per resource element. FIG. 1 is a diagram to show an existing definition of the ratio of PDSCH EPRE to DMRS EPRE (The ratio of PDSCH EPRE to DM-RS EPRE) ($1/\beta_{DMRS}$ [dB]), and FIG. 2 is a diagram to show an existing definition of the ratio of PUSCH EPRE to DMRS EPRE (The ratio of PUSCH EPRE to DM-RS EPRE) ($1/\beta_{DMRS}$ [dB]).

In FIG. 1 and FIG. 2, in a case that the number of DMRS code division multiplexing (CDM) groups without data (the Number of DM-RS CDM groups without data) is one, the ratio is 0 dB irrespective of DMRS configuration type (in other words, DMRS EPRE is the same as PDSCH/PUSCH EPRE).

Moreover, in FIG. 1 and FIG. 2, in a case that the number of DMRS CDM groups without data is two, the ratio is −3 dB irrespective of DMRS configuration type (in other words, DMRS EPRE is twice as large as PDSCH/PUSCH EPRE).

Hence, according to the existing definition of EPRE, when a DMRS is in a comb arrangement, the power spectral densities (PSDs) of data symbols and DMRS symbols are the same. When a DMRS is in a comb arrangement, the number of REs for DMRS symbols is one-half of that for data symbols, and hence the transmission power for the DMRS symbols results in being one-half of that for the data symbols.

If the same transmission power is not used for the data symbols and the DMRS symbols, this may cause negative effects such as interferences and reduction in throughput.

In view of this, the inventors of the present invention came up with the idea of a method for using the same transmission power for data symbols and DMRS symbols even in NR.

Embodiments according to the present disclosure will be described in detail with reference to the drawings as follows. The radio communication method according to each embodiment may be employed independently or may be employed in combination.

(Radio Communication Method)

In one embodiment, at least one of a UE and a base station determines an EPRE (or a PSD) for DMRS symbols so that UL transmission powers for data (UL-SCH) symbols and the DMRS symbols would be a certain power.

DMRS configuration types to be targeted may be as follows:

(1) DMRS configuration type 1 in a case that transform precoding is enabled, and
(2) DMRS configuration type 2 in a case that transform precoding is disabled.

Note that "transform precoding" may be interpreted as "DFT (Discrete Fourier Transform) precoding." In a case that transform precoding is enabled, the waveform of an uplink signal may be a single-carrier waveform, and DFT spread OFDM (DFT-S-OFDM (DFT Spread Orthogonal Frequency Division Multiplexing)) may be used.

Note that, although only a case in which the number of DMRS code division multiplexing (CDM) groups is one and the others are set to null is described, application is not limited thereto. For example, what is disclosed in the present disclosure may be applied to a case where FDM is performed on DMRS symbols (REs) and UL-SCH symbols (REs). Here, FDM may include both an aspect in which REs for a DMRS and REs for a UL-SCH are multiplexed separately in groups and an aspect in which each of the REs are multiplexed in a comb-like arrangement.

DMRS EPRE may be obtained through either of the following calculations:

(1) calculation without including an RE(s) set to null, and
(2) calculation by including an RE(s) set to null.

In the case of (1) described above, at least one of the UE and the base station may calculate the DMRS EPRE, based on the number of REs to which a DMRS is allocated in actual in one PRB on the assumption that the number of REs set to null is not included.

PDSCH DMRS EPRE may be derived from a PDSCH DMRS transmission power given based on FIG. 3 to be described later. PUSCH DMRS EPRE may be derived from a PUSCH DMRS transmission power given based on FIG. 4 to be described later. In this case, a DMRS transmission power may be defined as a linear average among power contributions of the REs configured in an operating system bandwidth for transmitting the DMRS.

FIG. 3 is a diagram to show an example of the ratio of PDSCH EPRE to DMRS EPRE ($1/\beta_{DMRS}$ [dB]), and FIG. 4 is a diagram to show an example of the ratio of PUSCH EPRE to DMRS EPRE ($1/\beta_{DMRS}$ [dB]).

In FIG. 3 and FIG. 4, in a case that the number of DMRS CDM groups without data is one, DMRS configuration type 1=−3 dB (in other words, the DMRS PSD is twice as high as the PDSCH/PUSCH PSD), DMRS configuration type 2=−4.77 dB (in other words, the DMRS PSD is three times as high as the PDSCH/PUSCH PSD).

Moreover, in FIG. 3 and FIG. 4, in a case that the number of DMRS CDM groups without data is two, DMRS configuration type 1=0 dB (in other words, the DMRS PSD is the same as the PDSCH/PUSCH PSD), DMRS configuration type 2=−1.76 dB (in other words, the DMRS PSD is three-second of the PDSCH/PUSCH PSD).

In FIG. 3 and FIG. 4, in a case that the number of DMRS CDM groups without data is three, DMRS configuration type 2=0 dB (in other words, DMRS PSD is the same as PDSCH/PUSCH PSD).

In a case of (2) described above, at least one of the UE and the base station assumes that DMRS EPRE is a transmission power obtained by averaging the DMRS EPREs in the tables shown in FIG. 1 and FIG. 2 with the number of REs in a PRB to which the DMRS is allocated.

Note that, in the case of (1) described above, it may be configured that both of the UL and DL tables are modified (for example, the UE and/or the base station follows FIG. 3 and FIG. 4), or may be configured that only the UL table is modified without modifying the DL table (for example, the UE and/or the base station follows FIG. 1 and FIG. 4). Here, to clarify modification of the tables described above, FIG. 1 may be referred to in a case of not modifying the DL table, FIG. 3 may be referred to in the case that the DL table is modified, FIG. 2 may be referred to in the case of not modifying the UL table, and FIG. 4 may be referred to in the case of modifying the UL table.

This is because, for UL, it is assumed that a restriction on a transmission power is stricter (SNR is lower), consequently deterioration in channel estimation accuracy affects greater, and hence the necessity of using the same transmission power for symbols is greater. In contrast, for DL, it is assumed that SNR is to be high, and hence there is a possibility that deterioration in property is small even without modifying the table.

According to the embodiment described above, it is possible to maintain the same transmission power for data symbols and DMRS symbols.

Variation of Embodiment

Note that in the case of (1) (calculation without including an RE(s) set to null) described above, interpretation may be applied to the number of DMRS CDM groups without data (the Number of DM-RS CDM groups without data) without modifying any of the UL and DL tables to maintain the same transmission power for the data symbols and DMRS symbols.

"Number of DMRS CDM groups without data" in FIG. 1 and FIG. 2 may be interpreted as the number of CDM groups other than the CDM groups with data among all the CDM groups (in other words, the "number of DMRS CDM groups without data" is the total of the number of DMRS CDM groups and the number of null (null resource) CDM groups) or includes these numbers of groups). The value of the number may be a value per MIMO (Multi Input Multi Output) layer or may be the total value of all the layers.

In a case of applying this interpretation, the number of DMRS CDM groups without data=1 in DMRS configuration type 1 means that the number of DMRS CDM groups=1 and the number of data CDM groups=1.

Moreover, the number of DMRS CDM groups without data=2 in DMRS configuration type 1 means that the number of DMRS CDM groups=1 and the number of null CDM groups=1.

The number of DMRS CDM groups without data=1 in DMRS configuration type 2 means that the number of DMRS CDM groups=1 and the number of data CDM groups=2.

The number of DMRS CDM groups without data=2 in DMRS configuration type 2 means that the number of DMRS CDM groups=1, the number of null CDM groups=1, and the number of data CDM groups=1.

The number of DMRS CDM groups without data=3 in DMRS configuration type 2 means that the number of DMRS CDM groups=1, the number of null CDM groups=2, and the number of data CDM groups=0.

In the case of applying the above-described interpretation, PDSCH DMRS EPRE may be derived from a PDSCH DMRS transmission power given based on FIG. 1. In the case of applying the above-described interpretation, PUSCH DMRS EPRE may be derived from a PUSCH DMRS transmission power given based on FIG. 2. In this case, a DMRS transmission power may be defined as a linear average among power contributions of the REs configured in an operating system bandwidth for transmitting the DMRS.

According to the variation of the embodiment described above, it is possible to maintain the same transmission power for data symbols and DMRS symbols. Moreover, with clear definitions of "DMRS EPRE," the number of DMRS CDM groups without data, and the like, it is possible to prevent a situation where a UE each having different interpretation results in performing a different operation (for example, a situation where UE #1 transmits DMRS symbols and data symbols with certain powers while UE #2 transmits DMRS symbols and data symbols with powers other than the certain powers).

(Radio Communication System)

Hereinafter, a structure of a radio communication system according to one embodiment will be described. In this radio communication system, the radio communication method according to each embodiment described above may be used alone or may be used in combination for communication.

FIG. 5 is a diagram to show an example of a schematic structure of the radio communication system according to one embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 can execute CA or DC by using a plurality of cells (CCs) (for example, up to five CCs or six or more CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (ME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, transmission confirmation information, scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

(Radio Base Station)

Figure 6:
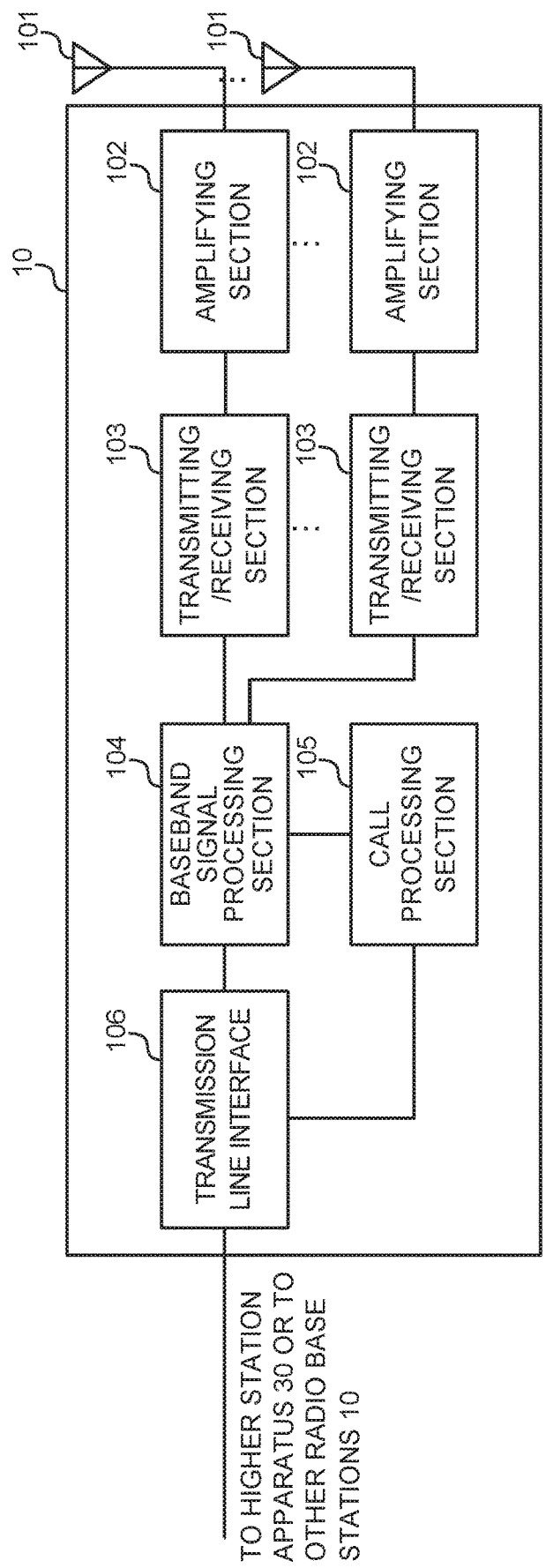
FIG. 6 is a diagram to show an example of an overall structure of a radio base station according to one embodiment.

FIG. 6 is a diagram to show an example of an overall structure of the radio base station according to one embodiment. A radio base station 10 includes a plurality of transmitting/receiving antennas 101, amplifying sections 102, transmitting/receiving sections 103, a baseband signal processing section 104, a call processing section 105 and a transmission line interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the transmission line interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present invention pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing (setting up, releasing, and so on) for communication channels, manages the state of the radio base station 10, manages the radio resources, and so on.

The transmission line interface 106 transmits and/or receives signals to and/or from the higher station apparatus 30 via a certain interface. The transmission line interface 106 may transmit and/or receive signals (backhaul signaling) with other radio base stations 10 via an inter-base station interface (for example, an optical fiber in compliance with the CPRI (Common Public Radio Interface) and an X2 interface).

Each of the transmitting/receiving sections 103 performs at least one of reception of a PUSCH demodulation reference signal and transmission of a PDSCH demodulation reference signal.

Figure 7:
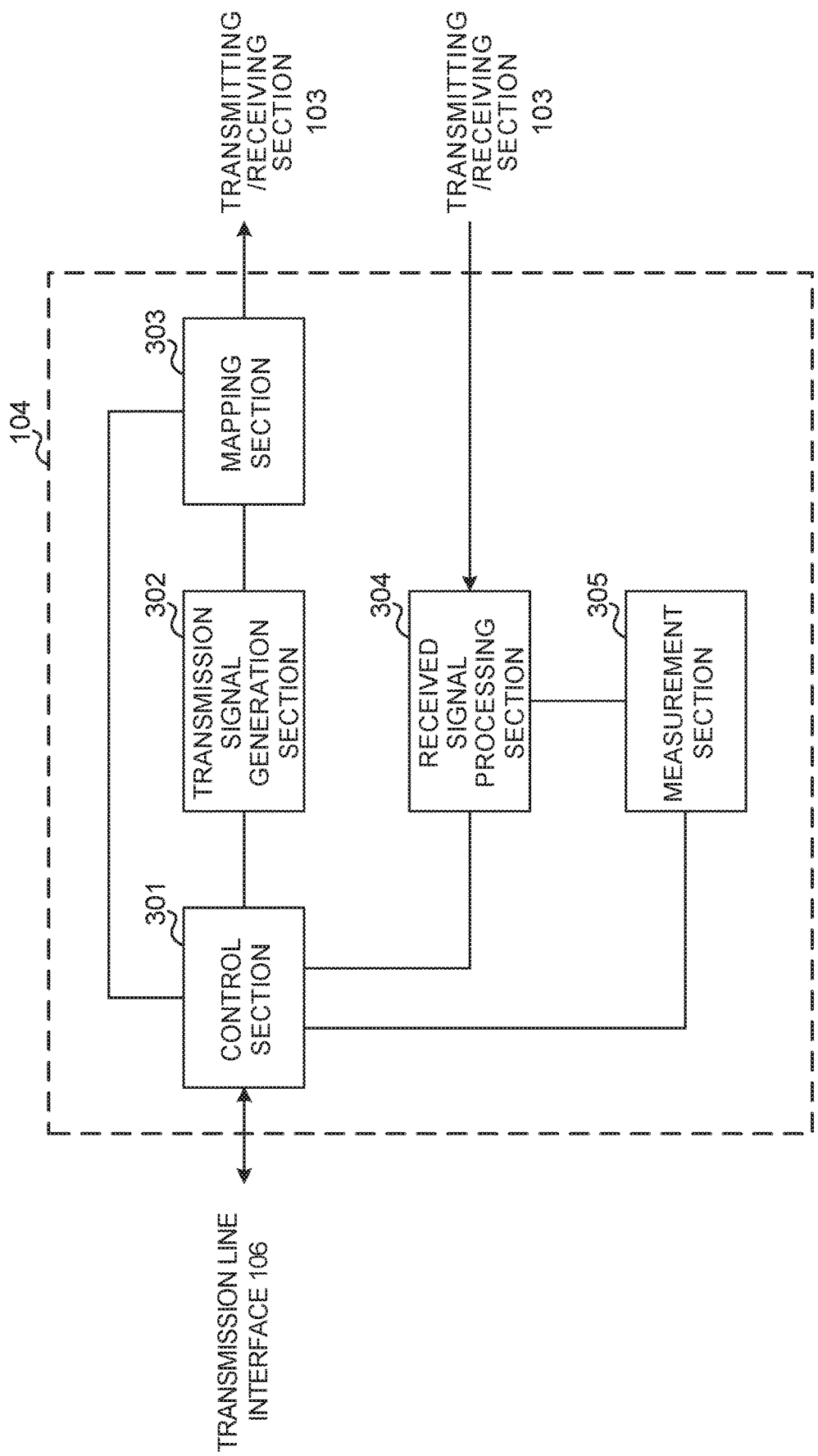
FIG. 7 is a diagram to show an example of a functional structure of the radio base station according to one embodiment.

FIG. 7 is a diagram to show an example of a functional structure of the radio base station according to one embodiment. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit, or control apparatus that can be described based on general understanding of the technical field to which the present invention pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource assignment) of system information, a downlink data signal (for example, a signal transmitted on the PDSCH), a downlink control signal (for example, a signal transmitted on the PDCCH and/or the EPDCCH, such as transmission confirmation information). Based on the results of determining necessity or not of retransmission control to the uplink data signal, or the like, the control section 301 controls generation of a downlink control signal, a downlink data signal, and so on. The control section 301 controls the scheduling of a synchronization signal (for example, PSS (Primary Synchronization Signal)/SSS (Secondary Synchronization Signal)), a downlink reference signal (for example, CRS, CSI-RS, DMRS), and so on.

The control section 301 controls the scheduling of an uplink data signal (for example, a signal transmitted on the PUSCH), an uplink control signal (for example, a signal transmitted on the PUCCH and/or the PUSCH, such as transmission confirmation information), a random access preamble (for example, a signal transmitted on the PRACH), an uplink reference signal, and the like.

The control section 301 that determines a power for the DMRS without taking account of any resource element to which the DMRS is not allocated, with reference to a table providing a definition of the ratio of a power (EPRE) for each resource element of the physical shared channel to an EPRE for the DMRS to which a certain number of CDM groups is applied.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit, or signal generation apparatus that can be described based on general understanding of the technical field to which the present invention pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit, or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit, or signal processing apparatus that can be described based on general understanding of the technical field to which the present invention pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit, or measurement apparatus that can be described based on general understanding of the technical field to which the present invention pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

(User Terminal)

Figure 8:
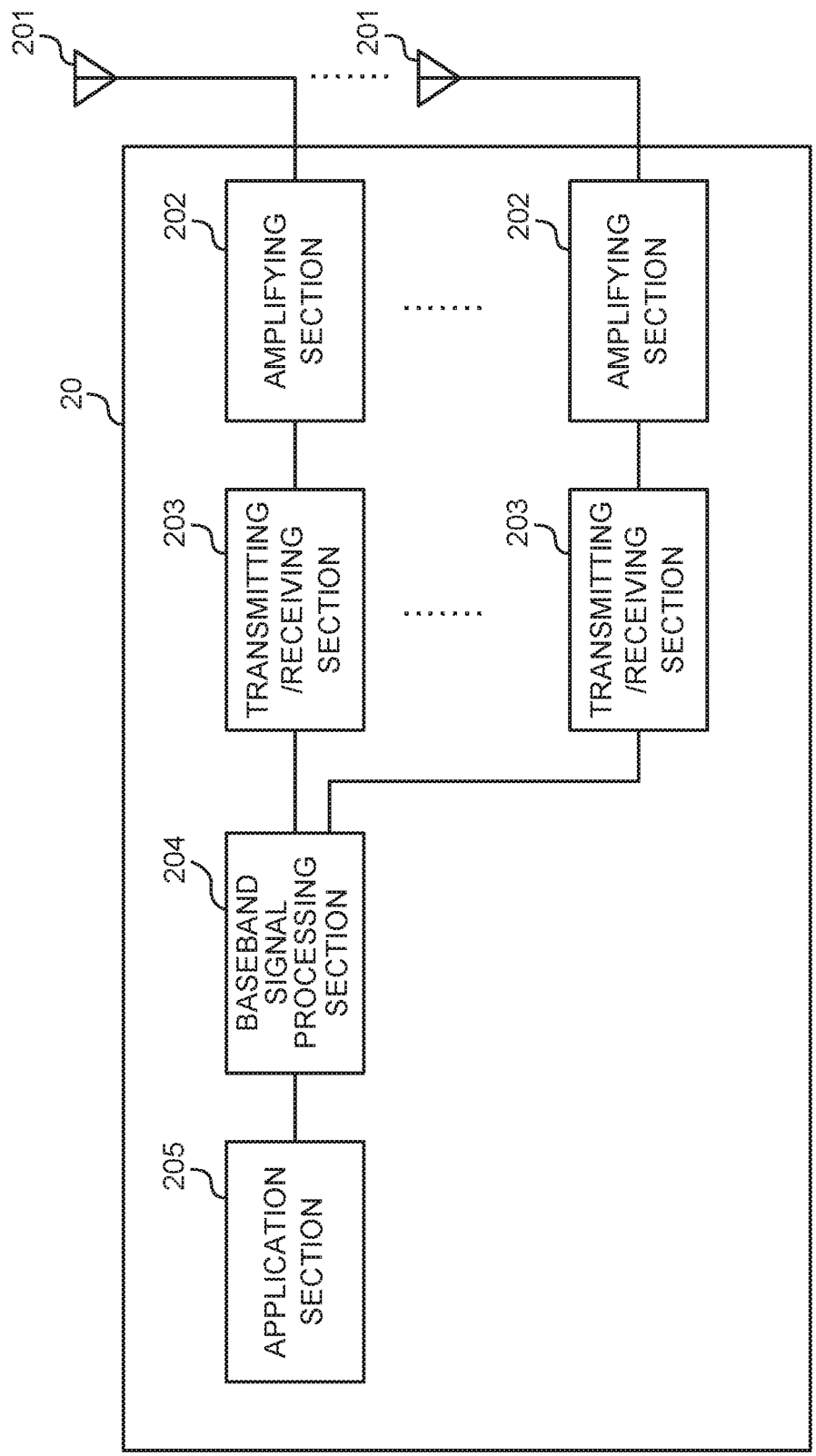
FIG. 8 is a diagram to show an example of an overall structure of a user terminal according to one embodiment.

FIG. 8 is a diagram to show an example of an overall structure of a user terminal according to one embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits, or transmitting/receiving apparatus that can be described based on general understanding of the technical field to which the present invention pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

Each of the transmitting/receiving sections 203 performs at least one of transmission of a PUSCH demodulation reference signal and reception of a PDSCH demodulation reference signal.

Figure 9:
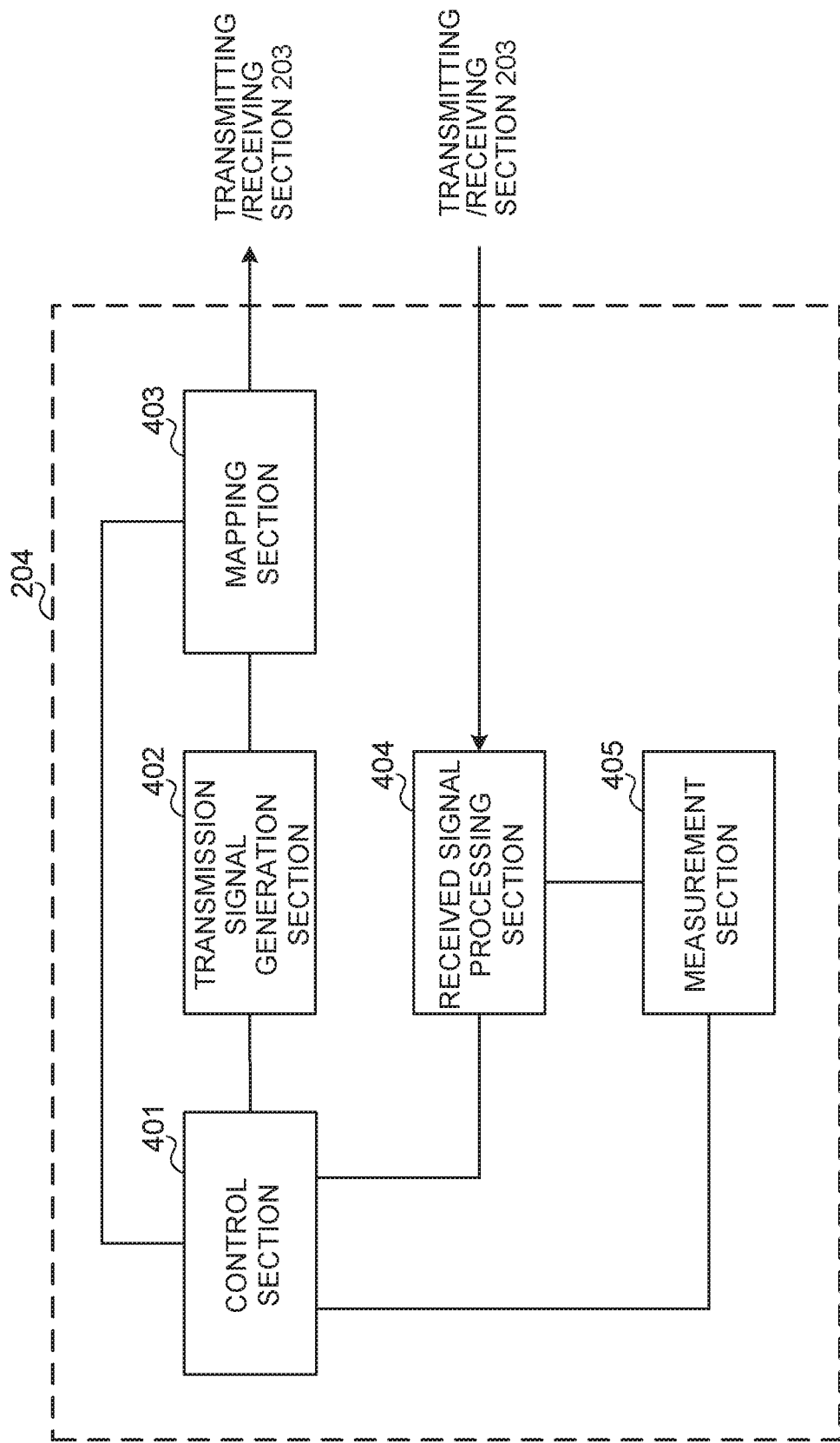
FIG. 9 is a diagram to show an example of a functional structure of the user terminal according to one embodiment.

FIG. 9 is a diagram to show an example of a functional structure of a user terminal according to one embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present invention pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

The control section 401 that determines a power for the DMRS without taking account of any resource element to which the DMRS is not allocated, with reference to a table providing a definition of the ratio of a power (EPRE) for each resource element of the physical shared channel to an EPRE for the DMRS to which a certain number of CDM groups is applied.

In the table, at least a DMRS configuration with mapping in a comb-tooth (Comb) arrangement may be defined, and at least in a case that number of CDM groups is one, an EPRE for a DMRS mapped in the Comb arrangement may be configured higher than an EPRE for a physical shared channel. Moreover, in the table, a DMRS configuration to be used in a case that transform precoding is not employed and a DMRS configuration to be used in a case that transform precoding is employed may be defined.

Alternatively, the control section 401 may include a control section that determines a power for the DMRS with reference to a table providing a definition of the ratio of a power (EPRE) for each resource element of the physical shared channel to an EPRE for the DMRS to which a certain number of CDM groups is applied, and the EPRE for the DMRS defined in the table may be an average power among resource elements in physical resource blocks to which the DMRS is allocated.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present invention pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present invention pertains. The received signal processing section 404 can be constituted with a receiving section according to the present invention.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present invention pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus.

Figure 10:
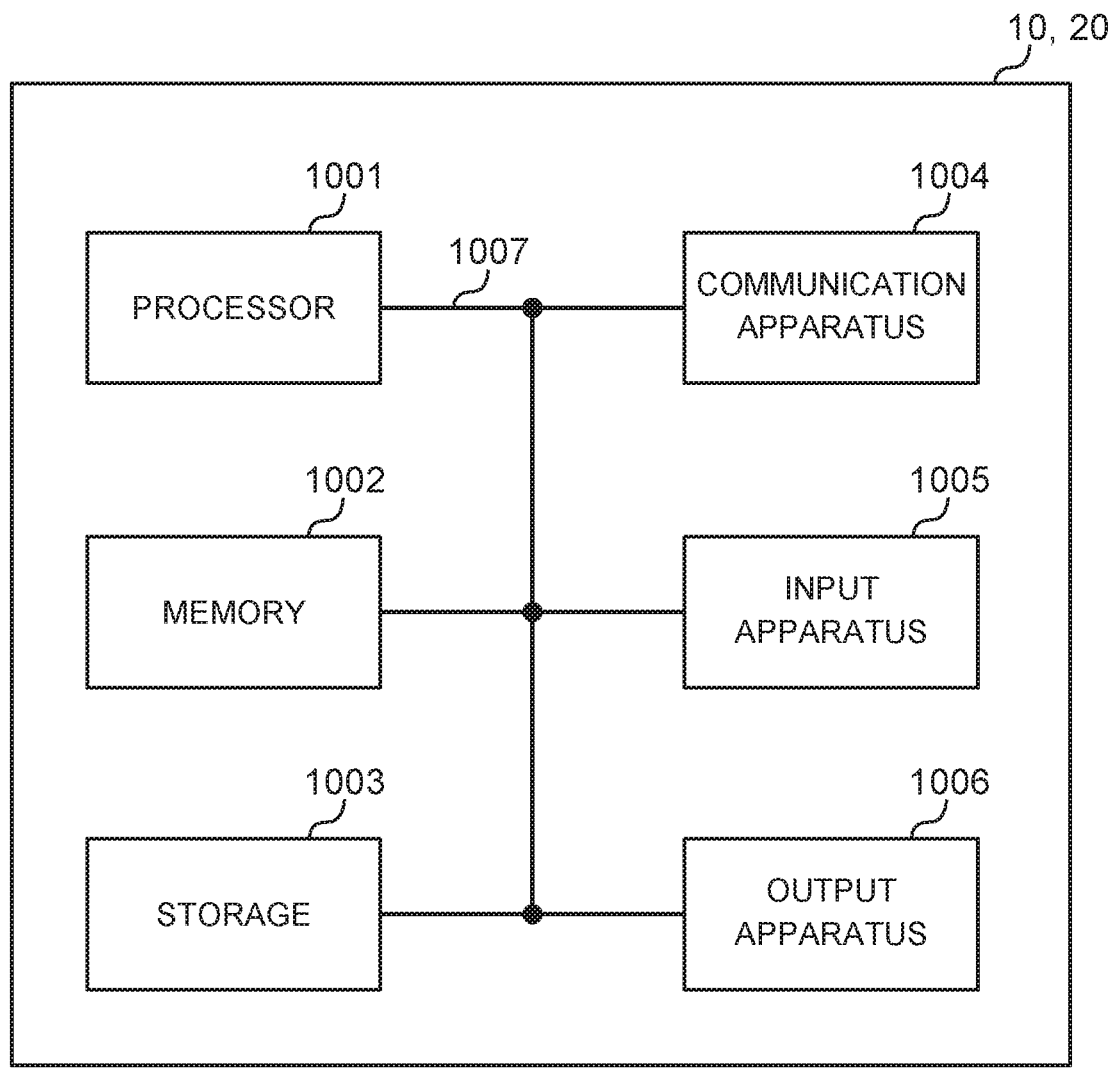
FIG. 10 is a diagram to show an example of a hardware structure of the radio base station and the user terminal according to one embodiment.

For example, a radio base station, a user terminal, and so on according to one embodiment of the present disclosure may function as a computer that executes the processes of the radio communication method of the present disclosure. FIG. 10 is a diagram to show an example of a hardware structure of the radio base station and the user terminal according to one embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, at least one of "channels" and "symbols" may be "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms.

For example, one subframe may be referred to as a "transmission time interval (TTI)," a plurality of consecutive subframes may be referred to as a "TTI" or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, codewords, or the like, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain.

Also, an RB may include one or a plurality of symbols in the time domain, and may be one slot, one mini-slot, one subframe, or one TTI in length. One TTI and one subframe each may be constituted of one or a plurality of resource blocks.

Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably.

In the present disclosure, the terms such as a "base station (BS)," a "radio base station," a "fixed station," a "NodeB," an "eNodeB (eNB)," a "gNodeB (gNB)," an "access point," a "transmission point," a "reception point," a "transmission/reception point," "a "cell," a "sector," a "cell group," a "carrier," a "component carrier," a "bandwidth part (BWP)," and so on can be used interchangeably. The base station may be referred to as the terms such as a "macro cell," a small cell," a "femto cell," a "pico cell," and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation.

Furthermore, the radio base station in the present disclosure may be interpreted as a user terminal. For example, each aspect/embodiment of the present disclosure may be applied to the structure that replaces a communication between a radio base station and a user terminal with a communication between a plurality of user terminals (for example, which may be referred to as "D2D (Device-to-Device)," "V2X (Vehicle-to-Everything)," and the like). In this case, the user terminals 20 may have the functions of the radio base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as a radio base station. In this case, the radio base stations 10 may have the functions of the user terminals 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." The terms "separate," "be coupled" and so on may be interpreted similarly.

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a control section that determines a power for a demodulation reference signal (DMRS) for a physical shared channel without taking account of any resource element (RE) to which the DMRS is not allocated, according to a ratio of energy per resource element (EPRE) of the physical shared channel to an EPRE for the DMRS to which a number of code division multiplexing (CDM) groups without data is applied; and
   a transmitting/receiving section that performs at least one of transmission and reception of the DMRS based on the power for the DIMS.

2. The terminal according to claim 1, wherein the control section determines the power for the DMRS without taking account of any RE to which the DMRS is not allocated, according to a table providing a definition of the ratio.

3. A radio communication method for a terminal comprising:
   determining a power for a demodulation reference signal (DMRS) for a physical shared channel without taking account of any resource element (RE) to which the DMRS is not allocated, according to a ratio of energy per resource element (EPRE) of the physical shared channel to an EPRE for the DMRS to which a number of code division multiplexing (CDM) groups without data is applied; and
   performing at least one of transmission and reception of the DMRS based on the power for the DMRS.

4. A base station comprising:
   a control section that determines a power for a demodulation reference signal (DMRS) for a physical shared channel without taking account of any resource element (RE) to which the DMRS is not allocated, according to a ratio of energy per resource element (EPRE) of the physical shared channel to an EPRE for the DMRS to which a number of code division multiplexing (CDM) groups without data is applied; and
   a transmitting/receiving section that performs at least one of transmission and reception of the DMRS on the power for the DMRS.

* * * * *